(12) United States Patent
Liles

(10) Patent No.: US 7,041,218 B1
(45) Date of Patent: May 9, 2006

(54) STATIC DEVICE AND METHOD OF MAKING

(75) Inventor: John Kevin Liles, Ocala, FL (US)

(73) Assignee: Inflowsion, L.L.C., Ocala, FL (US)

( * ) Notice: Subject to any disclaimer, the term of this patent is extended or adjusted under 35 U.S.C. 154(b) by 208 days.

(21) Appl. No.: 10/457,703

(22) Filed: Jun. 9, 2003

Related U.S. Application Data

(60) Provisional application No. 60/388,165, filed on Jun. 10, 2002.

(51) Int. Cl.
*B01D 17/038* (2006.01)
*B01D 21/26* (2006.01)

(52) U.S. Cl. .................. 210/512.1; 210/787; 209/434; 209/723; 209/725; 55/459.1

(58) Field of Classification Search ............. 210/512.1, 210/787; 209/434, 723, 725; 55/459.1
See application file for complete search history.

(56) References Cited

U.S. PATENT DOCUMENTS

| | | | |
|---|---|---|---|
| 650,575 A | 5/1900 | Whitney | |
| 770,599 A | 9/1904 | Monteagle | |
| 1,279,710 A | 9/1918 | Kirke | |
| 1,363,416 A | 12/1920 | Hooker | |
| 1,713,456 A | 5/1929 | Strindlund | |
| 1,853,045 A | 4/1932 | Gnau | |
| 2,119,864 A | 6/1938 | Kleucker | |
| 2,252,045 A | 8/1941 | Spanner | |
| 2,425,298 A | 8/1947 | Attridge et al. | |
| 2,661,194 A | 12/1953 | Katovsich | |
| 2,744,391 A | 5/1956 | Deane | |
| 2,933,293 A | 4/1960 | Ferrari, Jr. | |
| 2,983,993 A | 5/1961 | Johnson | |
| 2,983,994 A | 5/1961 | Johnson | |
| 3,337,194 A | 8/1967 | Zavasnik et al. | |
| 3,343,250 A | 9/1967 | Berto et al. | |
| 3,460,809 A | 8/1969 | Hauss | |
| 3,553,976 A | 1/1971 | Cumine et al. | |
| 3,578,075 A | 5/1971 | Winter | |
| 3,612,175 A | 10/1971 | Ford et al. | |
| 3,632,090 A | 1/1972 | White | |
| 3,647,187 A | 3/1972 | Dannewitz et al. | |
| 3,664,638 A | 5/1972 | Grout et al. | |
| 3,762,468 A | 10/1973 | Newson et al. | |
| 3,800,985 A | 4/1974 | Grout et al. | |
| 3,908,702 A | 9/1975 | Klosse et al. | |
| 3,951,813 A * | 4/1976 | Palma ..................... 210/512.1 |
| 4,072,296 A | 2/1978 | Doom | |
| 4,093,188 A | 6/1978 | Horner | |
| 4,111,402 A | 9/1978 | Barbini | |
| 4,112,520 A | 9/1978 | Gilmore | |
| 4,165,360 A | 8/1979 | Casper et al. | |
| 4,179,222 A | 12/1979 | Strom et al. | |
| 4,259,024 A | 3/1981 | Clasen et al. | |

(Continued)

*Primary Examiner*—David A. Reifsnyder
(74) *Attorney, Agent, or Firm*—Frijouf, Rust & Pyle, P.A.

(57) ABSTRACT

A static device and method of making is disclosed for mixing matter flowing therethrough. The invention comprises a tube having a polygonic cross section defining a plurality of corners. The tube is spirally twisted with the plurality of corners forming a plurality of helixes for causing the matter flowing through the tube to rotate in accordance with the plurality of helixes. In a first embodiment of the invention, the static device provides a static mixing device. In a second embodiment of the invention, the static device includes a plurality of apertures defined in the helix for providing a static separating device.

10 Claims, 6 Drawing Sheets

U.S. PATENT DOCUMENTS

| | | |
|---|---|---|
| 4,264,212 A | 4/1981 | Tookey |
| 4,305,460 A | 12/1981 | Yampolsky |
| 4,422,773 A | 12/1983 | Cassaday et al. |
| 4,462,903 A | 7/1984 | Wettengl |
| 4,511,258 A | 4/1985 | Federighi et al. |
| 4,576,714 A | 3/1986 | Pohoreski |
| 4,599,773 A | 7/1986 | Sievers |
| 4,688,319 A | 8/1987 | Gross et al. |
| 4,710,290 A | 12/1987 | Briltz |
| 4,840,493 A | 6/1989 | Horner |
| 4,865,460 A | 9/1989 | Friedrich |
| 4,929,088 A | 5/1990 | Smith |
| 4,936,689 A | 6/1990 | Federighi et al. |
| 4,981,368 A | 1/1991 | Smith |
| 5,013,429 A | 5/1991 | Krofta |
| 5,069,881 A | 12/1991 | Clarkin |
| 5,120,436 A | 6/1992 | Reichner |
| 5,145,256 A | 9/1992 | Wiemers et al. |
| 5,193,588 A | 3/1993 | Kanao |
| 5,248,421 A * | 9/1993 | Robertson ................ 210/512.1 |
| 5,326,537 A | 7/1994 | Cleary |
| 5,330,267 A | 7/1994 | Tauscher |
| 5,551,504 A | 9/1996 | Zifferer |
| 5,695,645 A | 12/1997 | Bober et al. |
| 5,720,886 A | 2/1998 | Iwinski |
| 5,758,695 A | 6/1998 | Carson |
| 5,765,946 A | 6/1998 | Lott |
| 5,800,059 A | 9/1998 | Cooke et al. |
| 5,960,870 A | 10/1999 | Takahashi et al. |
| 6,280,615 B1 | 8/2001 | Phillips et al. |
| 6,331,072 B1 | 12/2001 | Schierholz et al. |
| 6,332,980 B1 | 12/2001 | Moorehead |
| 6,346,197 B1 | 2/2002 | Stephenson et al. |
| 6,368,511 B1 | 4/2002 | Weissenberg et al. |
| 6,387,274 B1 | 5/2002 | Hendricks et al. |
| 6,395,175 B1 | 5/2002 | Gao et al. |
| 6,419,831 B1 | 7/2002 | Wang |
| 6,454,949 B1 | 9/2002 | Sesay et al. |

* cited by examiner

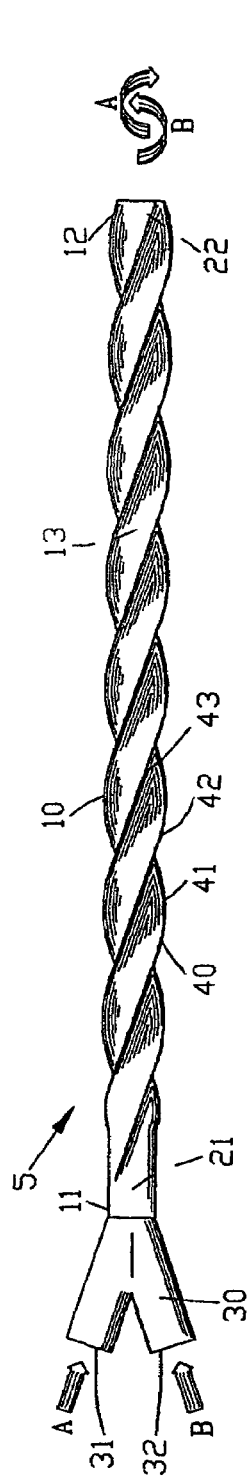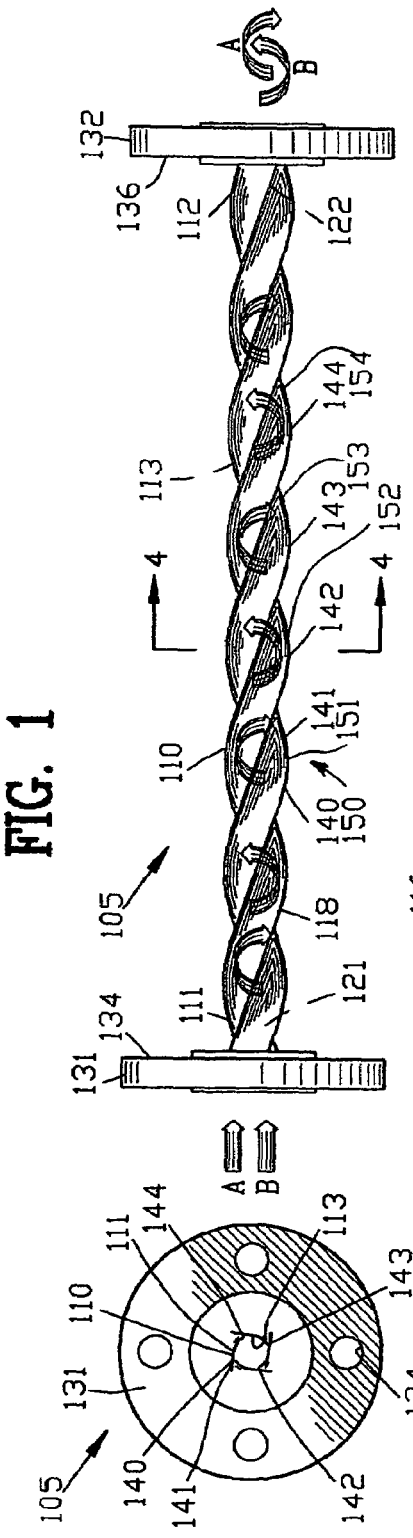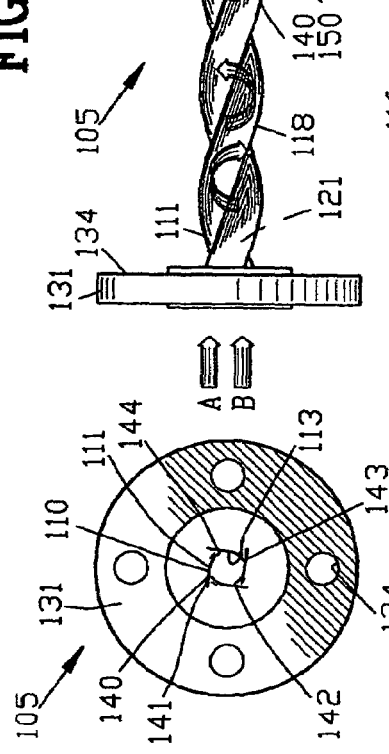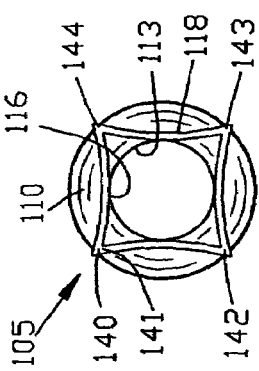

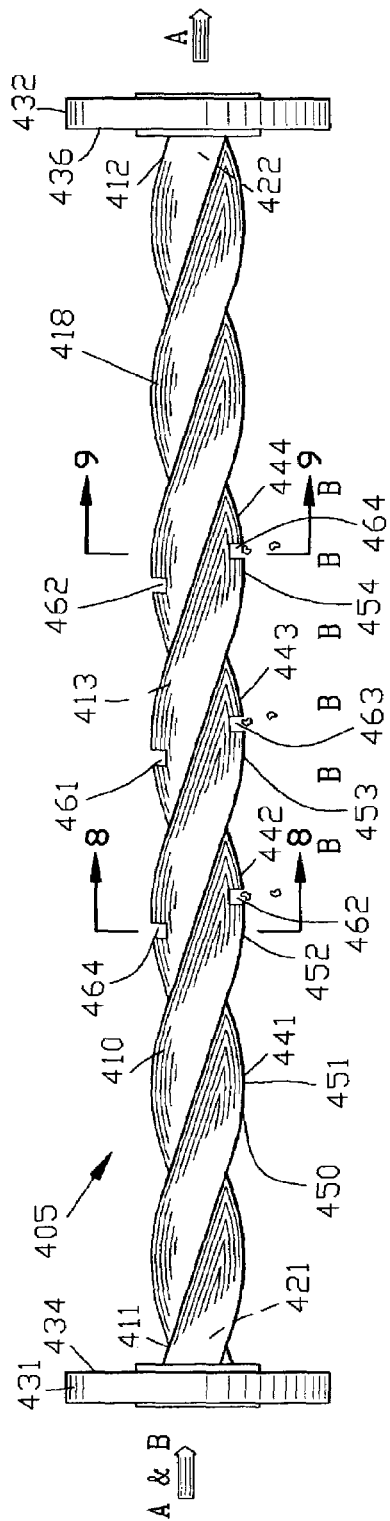
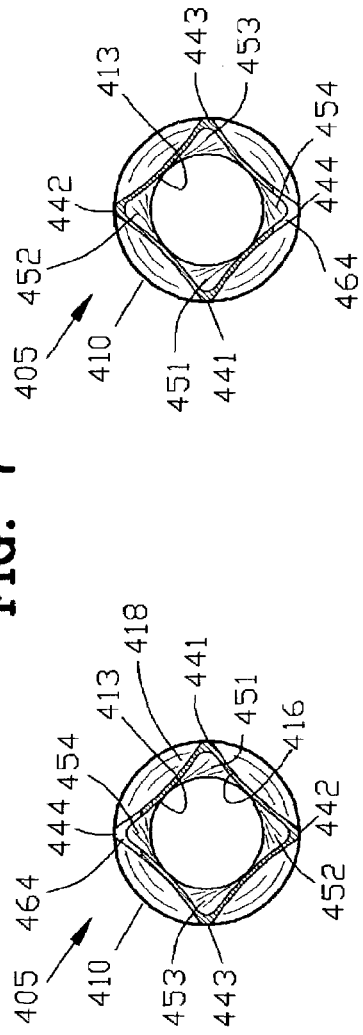
FIG. 7
FIG. 8
FIG. 9

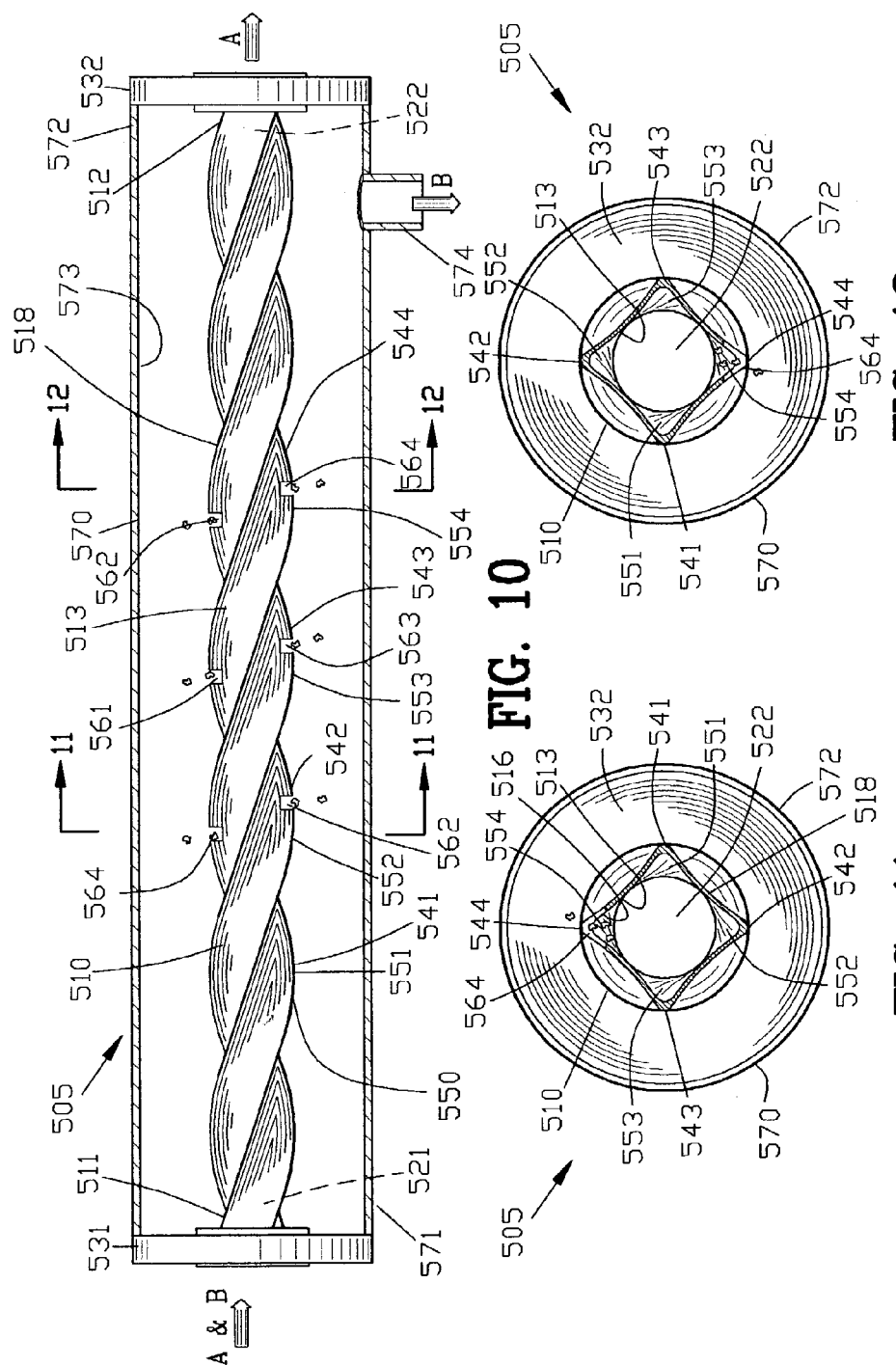

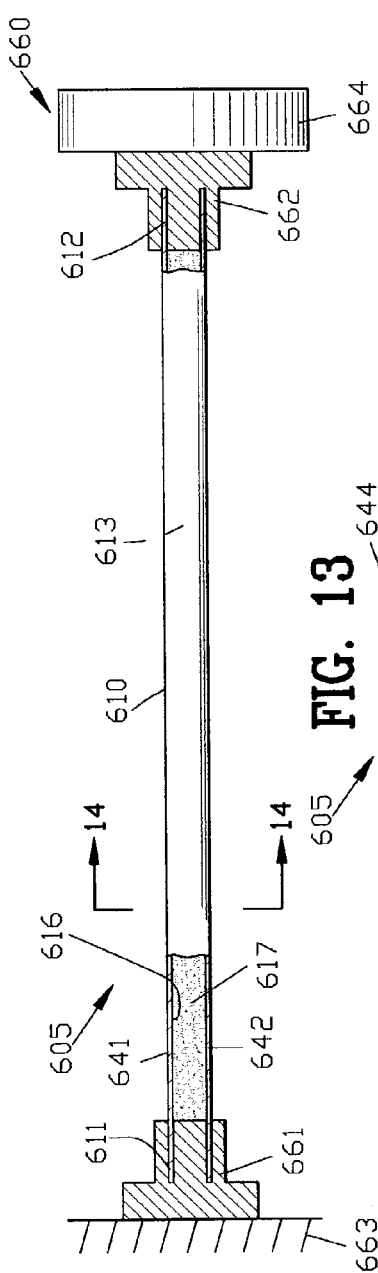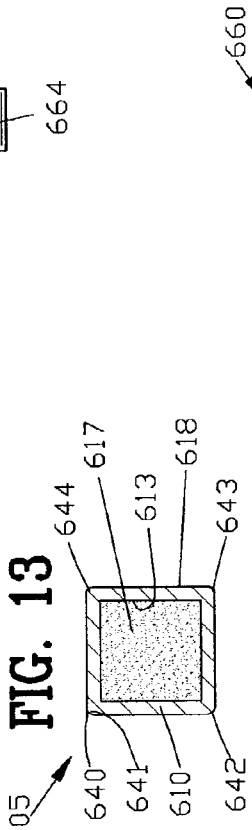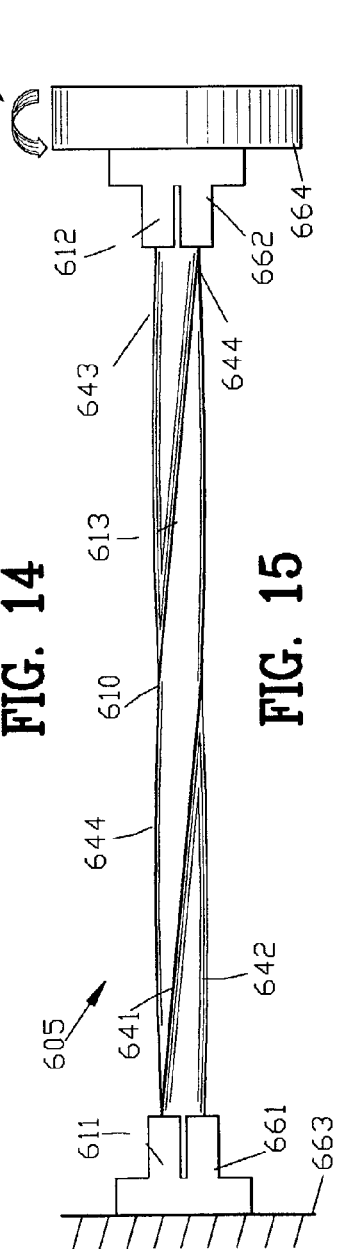
FIG. 13
FIG. 14
FIG. 15

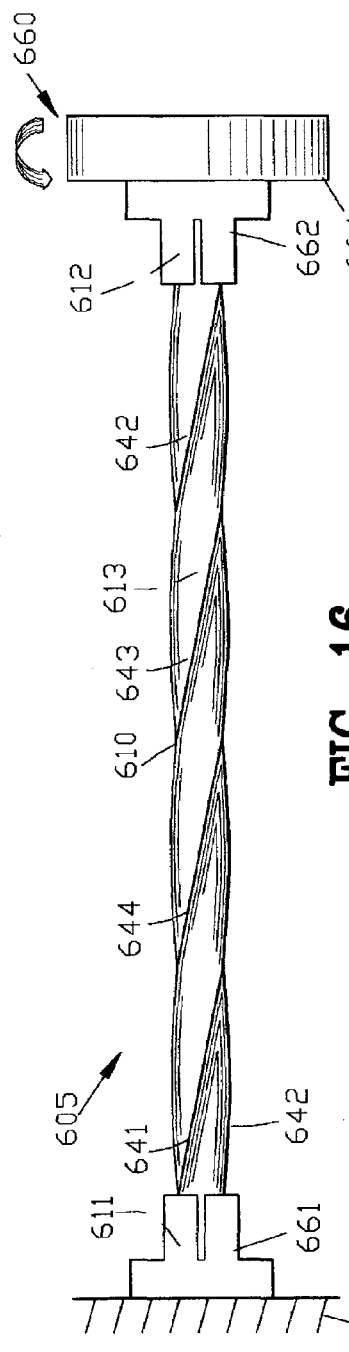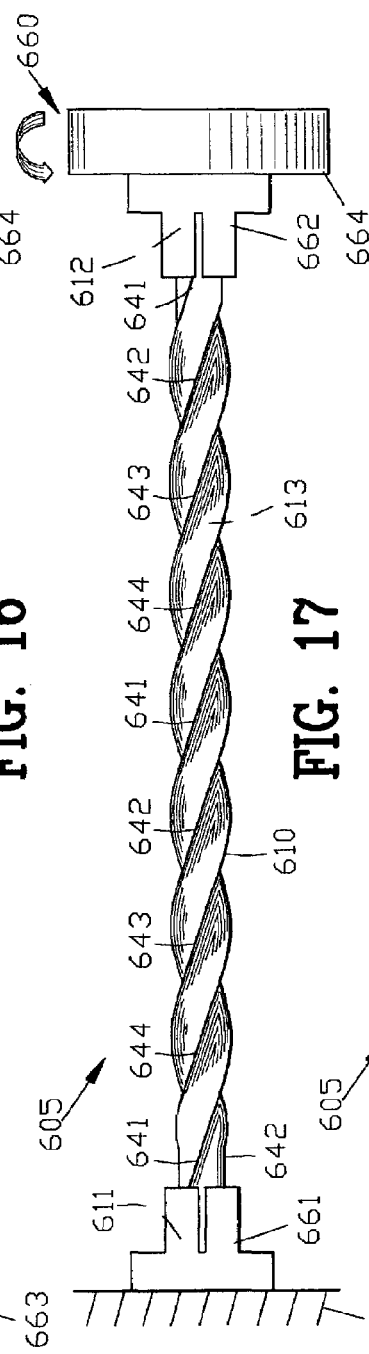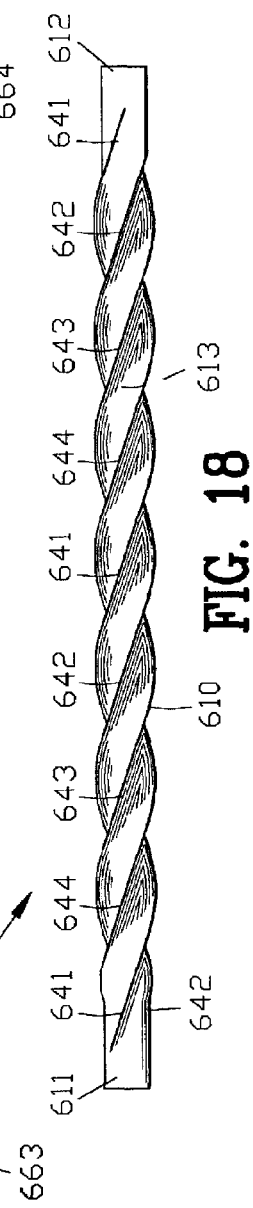

STATIC DEVICE AND METHOD OF MAKING

CROSS-REFERENCE TO RELATED APPLICATIONS

This application claims benefit of U.S. Patent Provisional application Ser. No. 60/388,165 filed Jun. 10, 2002. All subject matter set forth in provisional application Ser. No. 60/388,165 is hereby incorporated by reference into the present application as if fully set forth herein.

BACKGROUND OF THE INVENTION

1. Field of the Invention

This invention relates to mixing and separation of matter and more particularly to an improved static mixer and separation device.

2. Background of the Invention

The art of mixing comprises the agitation, distribution, intermingling, and homogeneity of matter. Agitation of matter with the intent to blend is specifically considered to be mixing. Other processes which depend upon and are promoted by agitation and mixing include chemical reactions, heat transfer, dispersion and mass transfer, including both solubility and crystallization. The type, extent and intensity of mixing determines both the process rate and adequacy of the mixing. In all mixing processes, energy must be added in order to effect mixing. Mixing is accomplished by a variety of equipment. Typical of this equipment is the impeller mixer generally used in a closed container and in a batch mixing process. In a continuous mixing process, pipeline blending is a commonly used mixing method. In some continuous process mixing systems, a baffled mixing cell is provided with one or two impellers on a powered shaft.

Static mixers comprise a group of devices comprising motionless devices. These pipe based devices generally contain internal baffles or other devices requiring no external energy to produce a turbulent flow in the pipe other than the energy required to move the matter through the pipe system. Subsequent mixing of the matter therein occurs as the matter is in transit through the pipe system. However, the internal baffles and internal turbulent flow producing devices require additional energy to be applied to the matter traversing the static mixer. The internal baffles also create a non-uniform pressure drop between the inlet and outlet of the system. Additionally, the internal baffles and other internal turbulent flow producing devices may become obstructions to flow. Clean up of these devices when mixing or reacting certain kinds of matter can present significant problems such as polymeric reactions, mixtures of viscous materials and the like. A variety of static mixers has been described in the literature.

U.S. Pat. No. 2,252,045 to Edward Frank Spanner discloses an invention concerned with tubular heat exchange apparatus in which heat transfer is required between hot and cold fluids, and in which the hot fluid i.e. gas or liquid is passed from an inlet chamber to an outlet chamber through a multiplicity of straight tubes expanded into tube plates at the ends of a shell containing or confining the cold fluid i.e. gas or liquid, to which heat is to be transferred.

U.S. Pat. No. 3,337,194 to Zavasnik et al. discloses an in-line blender for particulate materials comprising in combination an elongated chamber having provided therein a plurality of baffle means each so adapted as to partially traverse said chamber thereby obstructing the path flow of solids at one or more points within said chamber.

U.S. Pat. No. 3,612,175 to Ford et al. discloses an improved corrugated metal tubing having an improved heat-transfer coefficient and having a plurality of lands and grooves extending along the circumference thereof. The grooves comprise at least two independent, continuous grooves extending helically along the circumference of the tube, with each groove being in spaced relationship to each other. Improved heat transfer is obtained by providing that the land width, the groove width and the angle of advance of the helically extending grooves are related in a particular defined manner.

U.S. Pat. No. 3,647,187 Dannewitz et al. discloses a static mixer and method of making the same which mixer is capable of simultaneously mixing together a plurality of fluids, usually at least two liquids, in a stream which may be segmented by a fluid which may be a gas, comprising one or more elements forming an elongated fluid passageway for conveying the fluids while at least two liquids are intermixed. A helix is formed within the passageway to impart a rotational movement to the stream so that the rotational velocity at the liquid-wall interface is greater than that at the center of the stream, providing an efficient mixing action, without breaking up the gas segments.

U.S. Pat. No. 3,664,638 to Grout et al. discloses a device for thoroughly mixing components of a fluidic material flowing through a conduit which contains a plurality of curved sheet-like elements extending longitudinally through the conduit in which consecutive elements arc curved in opposite directions and the adjacent edges of consecutive elements are spaced from each other by a distance dependent on the Reynolds number of the fluid and angularly displaced with respect to each other by an angle 20 which differs from 90° by an amount dependent on said distance.

U.S. Pat. No. 3,800,985 to Grout et al. discloses a system for distributing a highly viscous molten material such as a molten polymer. The system includes means for heating the material to a molten state and moving it through a special mixing structure located just ahead of one or more output ports leading to a further processing system including a filament spinnerette. The mixing structure includes a conduit containing-a plurality of sheet-like elements extending longitudinally within the conduit, each element being curved to turn the direction of the material flowing past it. The elements are arranged in alternating right and left-handed curvature groups (a group consisting of one or more elements). The conduit is in contact with a heat exchange medium to maintain the polymer at its proper molten temperature. A modification for distributing molten glass is also disclosed as being substantially the same as for the molten polymer.

U.S. Pat. No. 3,908,702 to Klosse et al. discloses portions of fluid components being mixed during transport through a tube by continuously disturbing their flow pattern in a controlled manner during their passage through the tube. The disturbance is created by providing the tube with a radially inward profile which in a preferred form is an internal screw-thread of a thickness 0.25 to 0.75 times the internal diameter of the tube and having a pitch 0.75 to 1.5 times the internal diameter of the tube.

U.S. Pat. No. 4,072,296 to Lewis G. Doom discloses a motionless mixer including a number of baffles attached to a central rod slidably mountable within a hollow cylindrical conduit. A cross member is attached across the interior of the conduit and is configured to mate with a slot formed in the downstream end of the central rod, to prevent longitudinal motion or rotation of the mixer within the conduit.

U.S. Pat. No. 4,093,188 to Terry A. Homer discloses two or more fluids, particularly viscous fluids, may be thoroughly blended and homogenized with a static mixer and method using a mixing element which comprises two or more banks of stationary baffles arranged around an axis parallel to the overall direction of flow of the fluids to be mixed. The baffles in each bank of the element are inclined at an angle to the overall flow axis and at an angle to the baffles of adjacent banks so that fluid streams are guided through windows or apertures formed by abutting baffles along the interface between adjacent banks. Each bank includes a plurality of substantially parallel baffle plates spaced along the axis, and at least one of the banks has a second set of substantially parallel baffle plates spaced along the axis and alternating with the first set of baffles. The baffles of the second set are inclined to the axis at an angle different from the inclination of the baffles of the first set so that alternately converging and diverging passages are formed between the baffles. By this means, fluid streams are successively and repeatedly subdivided, converged and redivided into a plurality of substreams in sinuous, non-parallel spiraling paths to effect a more thorough and efficient blending of the fluids than previously possible.

U.S. Pat. No. 4,112,520 to Oscar Patton Gilmore discloses a static mixer for streams of flowing materials comprising a flow passage defined in a laminated body having end plates and a number of intermediate plates all detachably interconnected to form a unitary structure. The flow passage flows a serpentine path, crossing and recrossing boundaries between the several plates. Mixing structures are formed in the passage for combining, dividing and recombining streams of flowing materials in the passage by means of rotation of flow path and altering the cross-sectional shape of the flow paths. Disassembly of the several plates of the laminated body permits easy access to individual sections of the flow passage to facilitate cleaning and repair. Flow passage sections extend along a path that bends about an axis perpendicular to the direction of flow therein to facilitate mixing and to achieve curvature of the path to enable it is cross and recross the several boundary surfaces between adjacent plates and the laminated body. Flow rotator sections are positioned in intermediate plates to provide a linear flow path. The mixer may employ unique multiple flow rotators either stacked alone or together with flow path bending sections.

U.S. Pat. No. 4,179,222 to Strom et al. discloses a device for generating special turbulence patterns in fluids flowing in pipes, such as for mixing, promoting chemical reactions, or accelerating the transfer of heat to or from the fluid through the pipe wall. Two or more sets of flow dividers are mounted in the pipe, each set including a first and second flow divider with septum panel elements that overlap longitudinally of the pipe. The first flow divider septum elements mutually diverge downstream in a selected longitudinal plane in longitudinally overlapping relationship with septum elements of the second flow divider mutually diverging upstream in a different longitudinal plane so as to divert the fluid in such manner that the flow regions adjoining the pipe wall are caused to exchange positions with flow regions in the vicinity of the pipe axis. By reversing the relative incline angles of the septum elements of corresponding flow dividers of successive sets alternately when a succession of two or more sets are installed in direct series, the desired effects are augmented.

U.S. Pat. No. 4,511,258 to Federighi et al. discloses a motionless mixing device including a conduit having a mixing element therein which is formed by deforming flat stock material. The mixing element includes two substantially identical segments or halves that each having a sinuous cross-section between opposite ends and are interconnected along the center of the conduit with the two segments being axially staggered with respect to each other.

U.S. Pat. No. 4,688,319 to Gross, et al. discloses a method for production of a multi-layer gap-less steel pipe. An inner pipe and an outer pipe are formed from thermomechanically rolled steel strip with high notched bar impact strength by welding. The individual helical welding seam steel pipes of about the same lengths are matched with a difference of less than about one percent between the outer diameter of the inner pipe and the inner diameter of the outer pipe. The matched inner pipe is inserted into the outer pipe and the pipes are mechanically expanded with diameter control to a preset outer diameter of the multi-layer steel pipe. The resulting multi-layer steel pipe has the inner pipe disposed under compression and the outer pipe layer disposed under stress. The presence of a compression stress in the inner pipe provides a means opposed to hydrogen sulfide stress corrosion. The advantages of the helical welding seam steel pipes can be combined such as economic production, advantages relating to crack formation and crack propagation stopping, and the availability of high internal pressure loads upon use of thin, economic steel strip of different yield strength.

U.S. Pat. No. 4,840,493 to Terry A. Homer discloses motionless mixers and baffles thereof and includes a baffle having a pair of substantially symmetric opposing major surfaces generally helically twisted along a central longitudinal axis of the baffle and a first substantially planar surface connecting the pair of major surfaces at one end of the baffle, the first planar surface extending both substantially transversely and substantially parallel to the central longitudinal axis. The intersection of the first planar surface and one of the major surfaces forms a knife-like edge at the one end of the baffle. Similar additional knife-like edges can be provided, a second knife-like edge on the one end of the baffle radially disposed on opposite sides of each of a pair of axes through a central longitudinal axis of the baffle to form leading edges of the baffle and a like pair of knife-like trailing edges on an opposite end of the baffle. Such geometry enables a plurality of the baffles to be formed as a single insert unit by conventional injection molding techniques using only a pair of mold halves.

U.S. Pat. No. 4,865,460 to Juergen Friedrich discloses a static mixing device comprising a conduit in which there are located a plurality of rows of spaced parallel tubes extending across the conduit. The tubes are located in rows in which the adjacent rows extend in a longitudinal direction, but are located at right angles to each other. The heat transfer medium flows through the tubes to maintain the product in the conduit within a preselected temperature range. The adjacent rows of tubes abut each other and thus provide a tortuous path for the product in the conduit to effect mixing thereof.

U.S. Pat. No. 4,929,088 to Charles R. Smith discloses a static mixing device adapted to be inserted in a fluid stream having a main flow direction with respect to a closed conduit, comprising at least two tabs inclined in the flow direction at a preselected elevation angle between 10 degrees and 45 degrees to the surface of the conduit. The tabs are spaced apart in a direction transverse to the flow direction, the length and width of the tabs being selected so as to generate pairs of oppositely rotating predominantly streamwise vortices at the tips of each tab, and downstream hairpin vortices interconnecting adjacent streamwise vortices generated by a single tab.

U.S. Pat. No. 4,936,689 to Federighi et al. discloses a static material-mixing apparatus. The static material-mixing apparatus comprises a conduit having an axis and defining a chamber extending longitudinally therethrough opening on first and second ends of the conduit and a mixing element including two continuous segments in the chamber between the first and second ends, each having a generally sinuous cross-section between the first and second ends, the segments being disposed in radially spaced relationship with each other.

U.S. Pat. No. 4,981,368 to Charles R. Smith discloses a method and apparatus for generating tip vortices comprising a series of ramped tabs projecting inward at an acute angle from a bounding surface of a fluid containment and transport vessel such that the tabs are sloped in the direction of the fluid flow and spaced about the internal circumference of the bounding surface transverse to the main flow direction for causing vigorous cross-stream mixing through the generation of paired alternating rotation tip vortices from opposite sides of each tab with the vortices having their axes of rotation along the direction of the main flow. The vigorous cross-stream mixing will accomplish the equalization of various fluid properties such as velocity, thermal energy, kinetic energy and species concentration within the flow.

U.S. Pat. No. 5,069,881 to William J. Clarkin discloses a device and a method for the application of any adhesive. The device includes a hydraulically actuated mixhead which contains means to controllably deliver the components of a polyurethane based adhesive to the point of application of the adhesive and the means to separate between the components until the reaction between them is desired. Typically the components are in the form of streams and comprise an isocyanate stream and a polyol stream, the volume and flow velocity of each of which are in accordance within the invention hydraulically controlled.

U.S. Pat. No. 5,193,588 to Shiro Kanao discloses a pressure-resistant helical corrugated pipe comprising a helical corrugated pipe wall having a top portion, opposite side wall portions and a bottom portion. A continuous thin metal belt plate of a generally U-shaped transverse cross-section is disposed in one of the top portion and the bottom portion and also in at least part of the opposite side wall portions extending from the one of the top portion and the bottom portion. Another metal belt plate of a flat configuration is disposed in the other of the top portion and the bottom portion and disposed out of contact with the thin metal belt plate; and connective belt regions provided between the two metal belt plates in which the metal belt plates are absent. The connective belt regions being made of a synthetic resin or rubber to interconnect the two metal belt plates.

U.S. Pat. No. 5,330,267 to Willy Tauscher discloses a stationary fluid mixer in a flow conduit having at least two baffle plates secured to the wall of the conduit. The baffle plates are wider on the inside of the flow conduit than along the conduit wall, and they form an angle W of 10 degrees to 45 degrees relative to the main flow direction Z. The baffle plates can be given different orientations, and the projection FZ of the baffle plates in the main flow direction through the conduit is between 5 degrees to 30 degrees of the conduit cross-section F. This provides efficient mixing of the fluid in a simple manner.

U.S. Pat. No. 5,758,695 to Ken Carson teaches a hydraulically efficient ribbed pipe, wherein a pipe formed from a continuous, cold rolled, lock seam quality, sheet steel, and having a spiral rib. The pipe may be protected by an abrasion or corrosion resistant coating. The pipe is normally used for storm drains, culverts, sewer lines or HVAC. A closed spiral rib formed in the pipe wall adds strength to the wall, while maintaining a smooth inner wall that promotes exceptionally good fluid flow. The pipe has a smooth interior surface with outwardly projecting structural ribs of helical configuration throughout the length of the pipe.

U.S. Pat. No. 5,800,059 to Cooke, et al discloses a static mixer conduit comprising a longitudinally elongated conduit having tabs that are arranged with respective first edges adjacent the conduit wall, and respective opposed second edges that are spaced radially inwardly from the conduit wall. These tabs are operable as fluid foils so that with fluid flowing through the conduit, greater fluid pressures manifest against the tab's upstream faces relative to reduced fluid pressures against their downstream faces. The resultant pressure difference in the fluid adjacent, respectively, the mutually opposed faces of each of the tabs causes a longitudinal flow of fluid through the conduit over and past each said tab, to be redirected. As a result of that redirection, there is introduced a radial cross-flow component to the longitudinal flow of fluid through the conduit. In particular, the mixer further comprises a central body extending generally coaxially along at least a portion of the longitudinal extent of the conduit and defining between the central bodies surface and the conduit wall, an annular space confining the radial cross-flow. A method is also disclosed, which comprises static mixing, over a longitudinal extent of a mixing volume having an annular cross-section, wherein radial cross-stream mixing in a longitudinal fluid flow results from flow-redirecting tabs redirecting a longitudinal fluid flow from an outer, fluid containment boundary surface, across an intervening space having an annular cross-section towards an inner boundary surface.

In the past, I have used a process of twisting a length of polygonic tubing to produce an ornamental, decorative and non-functional metal work piece. The metal work was used for furniture, fence gates, lamps, table legs and the like. Although I have made, used and sold twisted lengths of polygonic tubing for ornamental, decorative and non-functional metal work pieces, I had no idea that the ornamental, decorative and non-functional metal work piece could be used as a mixing device or a separating device.

Therefore, it is an object of the present invention to provide an improved static device that overcomes the inadequacies of the prior art and provides a significant contribution to the art.

Another object of this invention is to provide an improved static device which provides substantially reduced flow restriction to matter flowing through device when compared with the prior art.

Another object of this invention is to provide an improved static device which provides static mixing device.

Another object of this invention is to provide an improved static device which provides static separating device.

Another object of this invention is to provide an improved device for the separation of high density matter from a lower density fluid.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention, the detailed description setting forth the preferred embodiment in addition to the scope of the invention defined by the claims taken in conjunction with the accompanying drawings.

SUMMARY OF THE INVENTION

Specific embodiments of the present invention are shown in the attached drawings. For the purpose of summarizing the invention, the invention relates to an improved apparatus and method of making of an external static mixing device for mixing matter flowing therethrough. The device comprises a tube having a polygonic cross section defining a plurality of corners. The tube is spirally twisted with the plurality of corners forming a plurality of helixes for causing the matter flowing through the tube to rotate in accordance with the plurality of helixes.

In a more specific embodiment of the invention, the static mixing device comprises a tube having a first and a second tube section. The first and second tube section have a polygonic cross section defining a plurality of corners. The first tube section is spirally twisted in a first direction with the plurality of corners forming a plurality of helixes for causing the matter flowing through the first tube section to rotate in a first rotational direction. The second tube section is spirally twisted in a second direction with the plurality of corners forming a plurality of helixes for causing the matter flowing through the second tube section to rotate in a second rotational direction. A coupling is provided for coupling the first tube section to the second tube section. The matter flowing through the first tube section rotates in a first rotational direction and the matter flowing through the second tube section to rotates in a second rotational direction. The reversal of flow rotation at the coupling of the first and second sections effects a turbulent flow to enhance the mixing of the matter within the tube.

In another embodiment of the invention, a static separation device for separating mixed matter flowing therethrough is disclosed. The invention comprises a tube having a polygonic cross section defining a plurality of corners. The tube is spirally twisted with the plurality of corners forming a plurality of helixes for causing the matter flowing through the tube to rotate in accordance with the plurality of helixes. The rotation of the matter centrifugally separates heavier high density matter from low density matter flowing through the tube. The tube extends between a first and a second end for defining a first, a second, and a third section. The first end of the first section of the tube provides an input for the mixed matter. The second section of the tube has a plurality of apertures defined in the helix for permitting centrifugally separated heavier matter to elute the tube. The second end of the third section of the tube provides an output for the matter remaining in the tube.

In a more specific embodiment of the invention, the static separation device comprises a tube having a polygonic cross section defining a plurality of corners. The tube is spirally twisted with the plurality of corners forming a plurality of helixes for causing the matter flowing through the tube to rotate in accordance with the plurality of helixes. The rotation of matter centrifugally separates high density matter from low density matter flowing through the tube. The tube extends between a first and a second end and defines a first, a second, and a third section. The first end of the first section of the tube provides an input for the mixed matter. The second section of the tube has a plurality of apertures defined in the helixes. The apertures permit centrifugally separated heavier matter to elute the tube. The third section of the tube provides an output for the matter remaining in the tube. An accumulation chamber is provided for accumulating the separated heavier matter following elution from the second section of the tube.

The invention is also incorporated into the method of making a static device from a tube having a polygonic cross section and extending between a first and a second end, comprising the steps of filling the tube with a particulate material. Rotating one of the first and second ends of the tube relative to the other of the first and second end of the tube to form a twisted tube; and removing the particulate material from the twisted tube.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which:

FIG. 1 is a side view of the static mixing device of the present invention in an operative mode;

FIG. 2 is a side view of a first embodiment of the static mixing device of the present invention;

FIG. 3 is an end view of FIG. 2;

FIG. 4 is a section view through line 4—4 of FIG. 2;

FIG. 7 is a side view of a first embodiment of a static separation device of the present invention illustrating the separation of heavier material in the matter flowing through the device;

FIG. 8 is a section view through line 8—8 of FIG. 7;

FIG. 9 is a section view through line 9—9 of FIG. 7;

FIG. 10 is a partially cut-away side view of a second embodiment of a static separation device of the present invention illustrating the separation of heavier material in the matter flowing through the device and the collection of the separated matter;

FIG. 11 is a section view through line 11—11 of FIG. 10;

FIG. 12 is a section view through line 12—12 of FIG. 10;

FIG. 13 illustrates a first step in the method of making a static device showing a section of tubing installed on a twisting apparatus;

FIG. 14 is a section view through line 14—14 of FIG. 13;

FIG. 15 illustrates a second step in the method of making a static device showing the beginning of a twisting operation;

FIG. 16 illustrates a third step in the method of making a static device showing the continued twisting operation;

FIG. 17 illustrates a fourth step in the method of making a static device showing the completed twisting operation; and FIG. 18 illustrates a fifth step in the method of making a static device showing the removal of the twisted tubing from the twisting apparatus.

Similar reference characters refer to similar parts throughout the several Figures of the drawings.

DETAILED DISCUSSION

Figure 5:
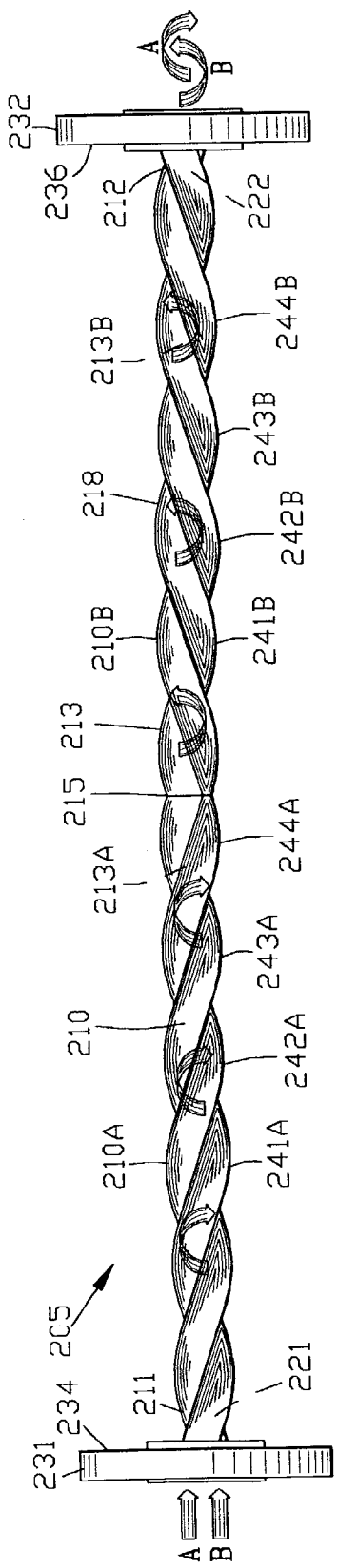
FIG. 5 is a side view of a second embodiment of the static mixing device of the present invention illustrating the reversing rotary direction of the fluid flow path.

FIG. 1 illustrates static mixing device 5 of the present invention shown in an operative mode. The static mixing device 5 comprises a tube 10 extending between a first and a second end 11 and 12 and defining an internal cross section 13.

The first and second ends 11 and 12 of the tube 10 define a first and a second port 21 and 22. A first and a second matter A and B enters the first port 21 to be mixed by the static mixer 5 to exit from the second port 22 as a mixture of the first and second matters A and B.

The first and second matters A and B may be a liquid, a gas or a solid material or a combination thereof. Preferably, one of the first and second matters A and B is a fluid for facilitating the movement of the first and second matters A and B through the tube 10 from the first end 11 to the second end 12.

In this example, the first port 21 comprises a Y member 30 having a first and a second input 31 and 32. The first and second matters A and B are directed through the first and second inputs 31 and 32 to enter the first port 21 of the tube 10. Although the first port 21 has been shown as a Y member 30 it should be understood that the first port 21 may take various configurations for directing the first and second matters A and B into the tube 10.

The first and second matters A and B entering the first port 21 of the tube 10 flow through the tube 10 to emerge from the second port 22 of the tube 10. As the first and second matters A and B flow through the tube 10 the static mixing device 5 causes rotation of the first and second matters A and B. The rotation of the first and second matters A and B causes the first matter A to mix with the second matter B. The mixed first and second matters A and B is eluted from a second port 22 of the static mixing device 5.

FIGS. 2–4 illustrate a first embodiment of the static mixing device 105 of the present invention. The static mixing device 105 comprises a tube 110 extending between a first and a second end 111 and 112 and defining an internal polygonic cross section 113 defined by an inner wall surface 116 and an outer wall surface 118. The first and second ends 111 and 112 of the tube 110 define a first and a second port 121 and 122. Preferably, the tube 110 is formed, using a cold twisting process, from a material having ductile characteristics. Preferably, the tube 110 is formed from a ductile metallic material such as carbon steel and alloys thereof. Additionally, various stainless steels and aluminum as well as copper, brass and bronze and alloys thereof have been utilized as the tube material. In the alternative, the tube 110 may be formed from plastic materials such as polyethylene and polypropylene that may be heated to provide the desired ductile properties.

In this embodiment, a first and a second flanges 131 and 132 are affixed to the first and second ends 111 and 112 of tube 110. Each of the first and second flanges 131 and 132 includes a plurality of bores 134 and 136 for securing the first and second ends 111 and 112 of the tube 110 to an external apparatus such as a piping system (not shown). In the alternative, the first and second flanges 131 and 132 enable a plurality of the static mixing devices 105 to be serially interconnected into a unit. It should be appreciated by those skilled in the art that other forms of attaching may be used to affix the first and second ends 111 and 112 of tube 110 an external apparatus (not shown).

The internal polygonic cross section 113 of the tube 110 defines a plurality of corners 140. In this embodiment, internal polygonic cross section 113 of the tube 110 is shown as a square cross-section having a plurality of corners 141–144. Although the internal polygonic cross section 113 has been shown as a square cross-section, it should be understood that the tube 110 may have various different types of cross-sections. Square metallic tubing having dimensions between 0.5×0.5 inches and 8×8 inches with thicknesses between 0.060 and 0.250 inches, as well as plastic square tubing having dimensions between 0.5×0.5 inches and 10×10 inches with thicknesses between 0.060 and 0.500 inches have been formed into the static mixing device 105.

An important aspect of the static mixing device 105 comprises the tube 110 being twisted between the first and second ends 111 and 112 of tube 110. The plurality of corners 141–144 of the tube 110 define a plurality of helixes 150 shown as helixes 151–154 along the length of the tube 110. The tube 110 maintains the square cross section along the length of the tube 110 as shown in FIG. 4. The pitch of the tubing 110, which is defined as the number of turns of a helix per foot is directly dependent upon the degree of mixing required. The pitch varies in value between 0 and 5 turns per foot of length of tubing 110.

As the A matter and the B matter moves between the first and second ends 111 and 112 of tube 110, the plurality of helixes 151–154 impart a rotary motion to the flow of the A matter and the B matter in accordance with flow direction arrows. The plurality of helixes 151–154 impart a rotary motion about a central axis (not shown) extending along the length of the tube 110. The rotary motion of the A matter and the B matter reduces the laminar flow within tube 110 and promotes mixing of the A matter with the B matter as the A and B matter moves along the tube 110 between the first and second ends 111 and 112. The mixture of the A and B matter emerges from the second end 112 of the tube 110. The turbulent flow produced in the static mixing device 105 through the plurality of helixes provides a scrubbing action along the internal pipe wall, reducing or eliminating foreign material build-up within the pipe resulting from laminar flow and sedimentation. The lack of any internal structure within the mixing device 105 enables the mixing device 105 to be particularly applicable to the mixing of a wide variety of materials which may include both solid and liquid phases. Some typical examples include wastewater, including coagulants and flocculants, potable water and chlorine, paints and catalysts, clay slurries, and various pulps.

FIG. 5 is a side view of a second embodiment of the static mixing device 205 of the present invention. The static mixing device 205 comprises a tube 210 extending between a first and a second end 211 and 212 and defining an internal polygonic cross section 213 defined by an inner wall surface 216 and an outer wall surface 218. The first and second ends 211 and 212 define a first and a second port 221 and 222. A first and a second flange 231 and 232 are affixed to the first and second ends 211 and 212 of tube 210.

The tube 210 comprises tube sections 210A and 210B interconnected by a coupling 215. Each of the tube sections 210A and 210B comprises the internal polygonic cross section 213A and 213B. In this example, the tube section 210A has a plurality of corners 241A–244A defining a plurality of helixes 250A shown as helixes 251A–254A. The tube section 210B has a plurality of corners 241B–244B defining a plurality of helixes 250B shown as helixes 251B–254B.

The direction rotation of the plurality of helixes 251A–254A of the tube section 210A is opposite to the direction rotation of the plurality of helixes 251B–254B of the tube section 210B. As the A matter and the B matter moves through the tube section 210A, the plurality of helixes 251A–254A impart a rotary motion to the flow of the A matter and the B matter in accordance with flow direction arrow. As the A matter and the B matter moves through the tube section 2101B, the plurality of helixes 251B–254B impart a rotary motion to the flow of the A matter and the B matter in accordance with flow direction arrow.

The plurality of helixes 251A–254A of the tube section 210A impart a rotary motion of the A matter and the B matter to reduce the laminar flow and to promote mixing of the A matter with the B matter within the tube section 210A. The plurality of helixes 251B–254B of the tube section 210B impart an opposite rotary motion of the A matter and the B matter to reduce the laminar flow and to promote mixing of the A matter with the B matter within the tube section 210B.

The opposite rotary motion imparted to the A matter and the B matter between the tube sections 210A and 210B results in the creation of a substantial turbulence at the coupling 215. The substantial turbulence created at the coupling 215 provides substantial mixing of the A matter and the B matter. The mixture of the A and B matter emerges from the second end 212 of the tube 2110.

Figure 6:
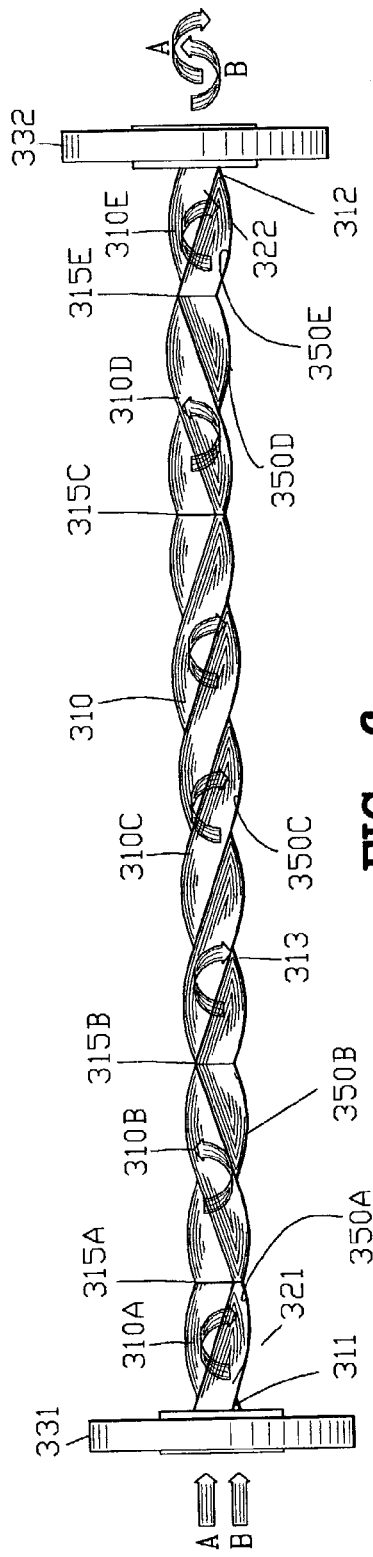
FIG. 6 is a side view of a third embodiment of the static mixing device of the present invention illustrating the multiple reversing rotary direction of the fluid flow path.

FIG. 6 is a side view of a third embodiment of the static mixing device 305 of the present invention. The static mixing device 305 comprises a tube 310 extending between a first and a second end 311 and 312 and defining an internal polygonic cross section 313. The first and second ends 311 and 312 define a first and a second port 321 and 322. A first and a second flange 331 and 332 are affixed to the first and second ends 311 and 312 of tube 310.

The tube 310 comprises tube sections 310A–310E interconnected by a coupling 315A–315D. Each of the tube sections 310A and 310E comprises the internal polygonic cross section 313 defining a plurality of helixes 350A–350E.

The direction rotation of the plurality of helixes 350A, 350C and 350E of the tube sections 310A, 310C and 310E is opposite to the direction rotation of the plurality of helixes 350B and 350D of the tube sections 310B and 310D.

As the A matter and the B matter moves through the tube sections 310A, 310C and 310E, the plurality of helixes 350A, 350C and 350E impart a rotary motion to the flow of the A matter and the B matter in accordance with flow direction arrow. As the A matter and the B matter moves through the tube sections 310B and 310D, the plurality of helixes 350B and 350D impart an opposite rotary motion to the flow of the A matter and the B matter in accordance with flow direction arrow.

The opposite rotary motion imparted to the A matter and the B matter at the coupling 315A–315D results in the creation of a substantial turbulence at the coupling 315A–315D. The substantial turbulence created at the coupling 315A–315D provides substantial mixing of the A matter and the B matter. The mixture of the A and B matter emerges from the second end 312 of the tube 310.

The length of the tube sections 310A and 310E adjacent the first and second ends 311 and 312 are shorter than the length of the adjacent tube sections 310B and 310D. The length of the central tube sections 310C is longer than the length of the tube sections 310B and 310D. The arrangement of the shorter length tube sections 310A and 310E and the tube sections 310B and 310D adjacent to the first and second ends 311 and 312, provides substantial mixing of the A matter and the B matter.

FIGS. 7–9 illustrate various views of a fourth embodiment of the present invention comprising an external static separation device 405. The external static separation device 405 comprises a tube 410 extending between a first and a second end 411 and 412 and defining an internal polygonic cross section 413 defined by an inner wall surface 416 and an outer wall surface 418. The first and second ends 411 and 412 define a first and a second port 421 and 422. A first and a second flange 431 and 432 are affixed to the first and second ends 411 and 412 of tube 410.

The tube 410 comprises an internal polygonic cross section 413. In this example, the tube 410 has a plurality of corners 441–444 defining a plurality of helixes 450 shown as helixes 451–454. A plurality of apertures 461–464 are defined in each of the plurality of corners 441–444 of the tube 410. The plurality of apertures 461–464 are disposed along the plurality of helixes 451–454.

A mixture of the A matter and the B matter is introduced into the first end 411 of tube 410. The plurality of helixes 451–454 impart a rotary motion to the flow of the mixture of the A matter and the B matter in accordance with flow direction arrow.

As the mixture of the A matter and the B matter moves between the first and second ends 411 and 412 of tube 410, the plurality of helixes 451–454 impart a rotary motion to the flow of the mixture of the A matter and the B matter in accordance with flow direction arrows. The plurality of helixes 451–454 impart a rotary motion about a central axis (not shown) extending along the length of the tube 410.

The rotary motion produces a centrifugal force on the mixture of the A matter and the B matter causing the higher density B matter to migrate to the plurality of corners 441–444 defining the plurality of helixes 451–454. As the mixture of the A matter and the B matter moves toward the second end 412 of tube 410, the higher density B matter is discharged through the plurality of apertures 461–464 disposed along the plurality of helixes 451–454. The lower higher density A matter passes through the tube 410 and is eluted from the second end 412 of the tube 410.

The external static separation device 405 of the present invention is especially suitable for separating dense solid particulate B matter from less dense fluid A matter. Preferably, the less dense fluid A matter is a liquid for providing suitable flow through the tube 410 to produce the required centrifugal force to separate the higher density B matter from the lower density A matter.

FIGS. 10–12 illustrate various views of a fifth embodiment of the present invention comprising an external static separation device 505. The external static separation device 505 comprises a tube 510 extending between a first and a second end 511 and 512 and defining an internal polygonic cross section 513 defined by an inner wall surface 516 and an outer wall surface 518. The first and second ends 511 and 512 define a first and a second port 521 and 522. A first and a second flange 531 and 532 are affixed to the first and second ends 511 and 512 of tube 510.

The tube 510 comprises an internal polygonic cross section 513. In this example, the tube 510 has a plurality of corners 541–544 defining a plurality of helixes 550 shown as helixes 551–554. A plurality of apertures 561–564 are defined in each of the plurality of corners 541–544 of the tube 510. The plurality of apertures 561–564 are disposed along the plurality of helixes 551–554.

An accumulation chamber 570 extends between a first and a second end 571 and 572. In this embodiment, the accumulation chamber 570 is illustrated as a tube coaxially surrounding the tube 510 of the external static separation device 505. The accumulation chamber 570 has an internal diameter greater than the external diagonal dimension of the tube 510. The first and second ends 571 and 572 of the accumulation chamber 570 are secured to the first and second flanges 531 and 532 for sealing the accumulation chamber 570. The first and second flanges 531 and 532 serve as end caps for the accumulation chamber 570. The accumulation chamber 570 includes an accumulation chamber drain 574 for removing matter from the interior of the accumulation chamber 570.

A mixture of the A matter and the B matter is introduced into the first end 511 of tube 510. The plurality of helixes 551–554 impart a rotary motion to the flow of the mixture of the A matter and the B matter in accordance with flow direction arrow. The rotary motion produces a centrifugal force on the mixture of the A matter and the B matter causing the higher density B matter to migrate to the plurality of corners 541–544 defining the plurality of helixes 551–554. As the mixture of the A matter and the B matter moves toward the second end 512 of tube 510, the higher density B matter is discharged through the plurality of apertures 561–564 disposed along the plurality of helixes 551–554 into the accumulation chamber 570. The lower density A matter passes through the tube 510 and is eluted from the second end 512 of the tube 510. The heavier B matter is subsequently removed from accumulation chamber 570 through accumulation chamber drain 574. The lack of any internal structure within the static separation device 505 enables the separation device 505 to be particularly applicable to the separation of a wide variety of materials which may include both solid and liquid phases. Some typical examples include the separation of solids from wastewater, the separation of dissimilar fluids such as oil and water, as well as the separation of materials with varying densities.

FIG. 13 illustrates a first step in the method of making a static device 605 showing a section of tubing 610 extending between a first and a second end 611 and 612 and defining an internal polygonic cross section 613 defined by an inner wall surface 616 and an outer wall surface 618. In this example, the tubing 610 is shown as a ductile metallic material.

FIG. 14 is a section view through line 14—14 of FIG. 13 illustrating the polygonic cross section 613 of the tubing 610. The tubing 610 is filled with a particulate material 617 which is a substantially flowable and a substantially incompressible material such as sand or the like. The particulate fill material is chosen for specific physical characteristics. The material must be substantially incompressible to ensure minimal deformation of the cross section of the polygonic tubing. The twisting of the poygonic tubing results in an approximate 4% reduction of overall tubing length. This reduction in overall length effects a corresponding reduction in the internal volume of the polygonic tubing. The reduction in volume requires a corresponding reduction in the fill material volume. Through careful choice of particle size distribution and fill material fracturability, a material is chosen which will minimize polygonic tube deformation and still reduce volume by fracturing and filling the interstices with fractured fill material. A typical choice for fill material is 30/60 mesh sand. Generally the fill material may be reused once before discarding due to the increase in small particle size material due to fracturing. In this example, the polygonic cross section 613 of the tubing 610 is illustrated as square tubing having four corners 641–644.

The tubing 610 is shown installed in a twisting apparatus 660. The first end 611 of the tubing 610 is inserted into first collet 661 whereas the second end 612 of the tubing 610 is inserted into a second collet 662. The first collet 661 is affixed to a support 663 whereas the second collet 662 is affixed to a rotatable collet mount 664.

FIG. 15 illustrates a second step in the method of making a static device 605 showing the beginning of a twisting operation. The second collet 662 is rotated by the rotatable collet mount 664. The rotation of the second end 612 of the tube 610 relative to the first end 611 of the tube 610 initially forms a uniform twist in the tube 610.

FIG. 16 illustrates a third step in the method of making a static device 605 showing the continued twisting operation. The rotation of the second end 612 relative to the first end 611 of the tube 610 forms a plurality of helixes 651–654 from each of the corners 641–644 of the tubing 610.

FIG. 17 illustrates a fourth step in the method of making a static device 605 showing the completed twisting operation. The number of rotations of the second end 612 relative to the first end 611 of the tube 610 determines the pitch of the plurality of helixes 651–654.

FIG. 18 illustrates a fifth step in the method of making a static device 605 showing the removal of the twisted tubing 605 from the twisting apparatus 660. After the static device 605 is removed from the twisting apparatus 660, the particulate matter 617 is removed from the tube 610.

It should be understood by those skilled in the art that although the foregoing description referred to pressure applied to the inlet in order to effect the movement of material within the static device, movement of material may also be effected by the application of a vacuum or reduced pressure applied to the outlet of the static device.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A static separation device for separating mixed matter flowing therethrough comprising:
   a tube having a first and a second end;
   said first end of said tube providing an input for the mixed matter;
   said tube having a generally square cross section defining four generally acute corners;
   said tube being spirally twisted about a common axis extending between said first and second ends of said tube with four generally acute corners forming four helixes for causing the mixed matter flowing through said tube to rotate within said tube in accordance with said four helixes;
   said rotation of the matter centrifugally separating high density matter from low density matter flowing through said tube;
   a plurality of apertures defined in said four helixes for permitting centrifugally separated high density matter to elute said tube; and
   said second end of said tube for providing an output for the low density matter flowing through said tube.

2. A static separation device as set forth in claim 1, wherein said tube comprises a pitch greater than 0 and less than 5 turns per foot, wherein said pitch comprises a number of revolutions of each of said helixes per foot of length of said tube.

3. A static separation device as set forth in claim 1, wherein said tube comprises a metallic tube.

4. A static separation device as set forth in claim 1, wherein said tube comprises a ductile material.

5. A static separation device for separating mixed matter flowing therethrough as set forth in claim 1, further comprising;
   an accumulation chamber for accumulating the separated high density matter following elution from said tube;
   said accumulation chamber having a first end wherein said first end of said tube extends therethrough;
   said accumulation chamber having a second end wherein said second end of said tube extends therethrough; and
   said accumulation chamber having an exit port in fluid communication with said accumulation chamber for removing the separated high density matter.

6. A static separation device for separating mixed matter flowing therethrough as set forth in claim 1, further comprising;
   an accumulation chamber for accumulating the separated high density matter following elution from said tube;
   said accumulation chamber having a first end wherein said first end of said tube extends therethrough;
   said accumulation chamber having a second end wherein said second end of said tube extends therethrough;
   said accumulation chamber having an exit port in fluid communication with said accumulation chamber for removing the separated high density matter; and
   said accumulation chamber having an internal diameter greater than an external diagonal dimension of said cross section of said tube.

7. A static separation device for separating mixed matter flowing therethrough comprising:
   said tube having a first and a second end;
   said first end of said tube providing an input for the mixed matter;
   a tube having a generally square cross section defining four generally acute corners;
   said tube being spirally twisted about a common axis extending between said first and second ends of said tube with four generally acute corners forming four helixes for causing the matter flowing through said tube to rotate within said tube in accordance with said four helixes;
   said rotation of matter centrifugally separating high density matter from low density matter flowing through said tube;
   a plurality of apertures defined in each of said four generally acute corners of said four helixes for permitting centrifugally separated high density matter to elute said tube; and
   said apertures for permitting centrifugally separated high density matter to elute said tube;
   said second end of said tube for providing an output for the low density matter flowing through said tube;
   an accumulation chamber for accumulating the separated high density matter following elution from said tube;
   said accumulation chamber having a first end with said first end of said tube extending therethrough;
   said accumulation chamber having a second end with said second end of said tube extending therethrough; and
   said accumulation chamber having an exit port communicating with said accumulation chamber for removing the separated high density matter.

8. A static separation device as set forth in claim 7, wherein said tube comprises a pitch greater than 0 and less than 5 turns per foot, wherein said pitch comprises a number of revolutions of each of said helixes per foot of length of said tube.

9. A static separation device as set forth in claim 7, wherein said tube comprises a metallic tube.

10. A static separation device as set forth in claim 7, wherein said tube comprises a ductile material.

* * * * *